April 1, 1969      F. J. ZIOLKO      3,435,482
MACHINE AND PROCESS OF LINKING STUFFED CASINGS
Filed July 2, 1965
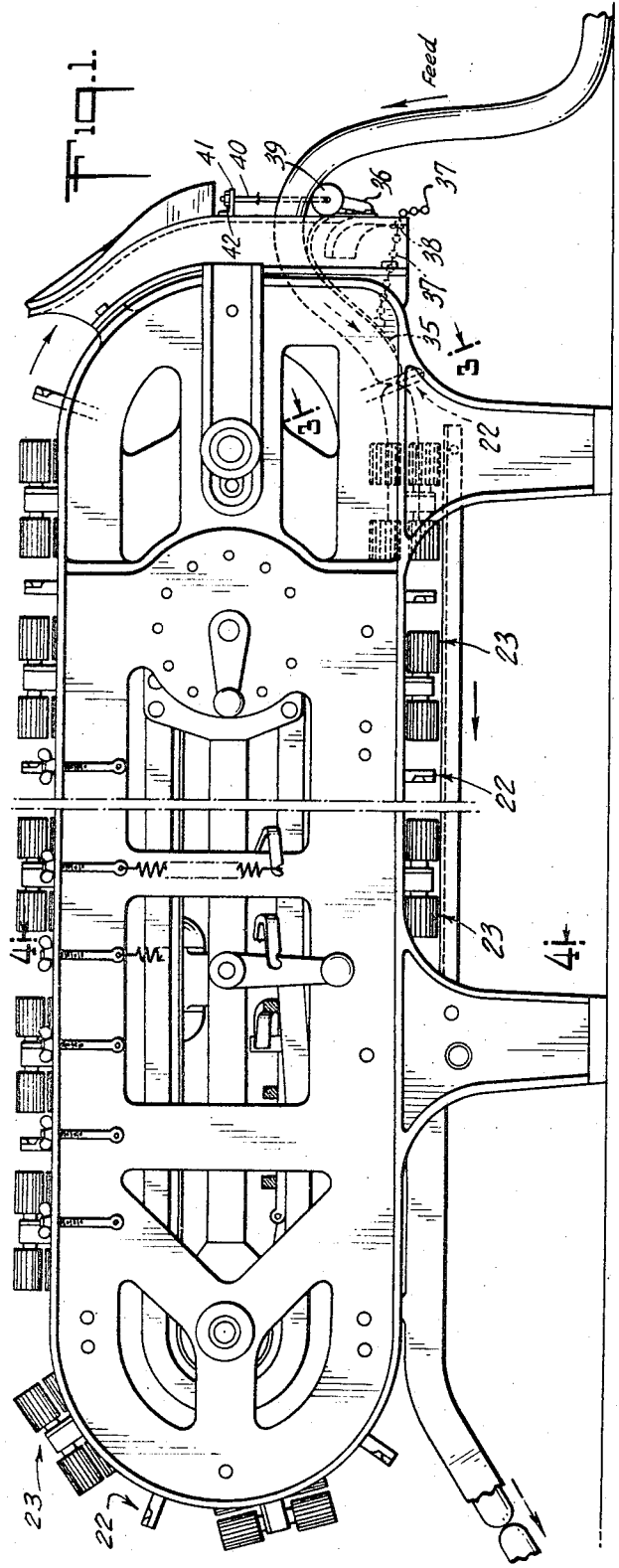
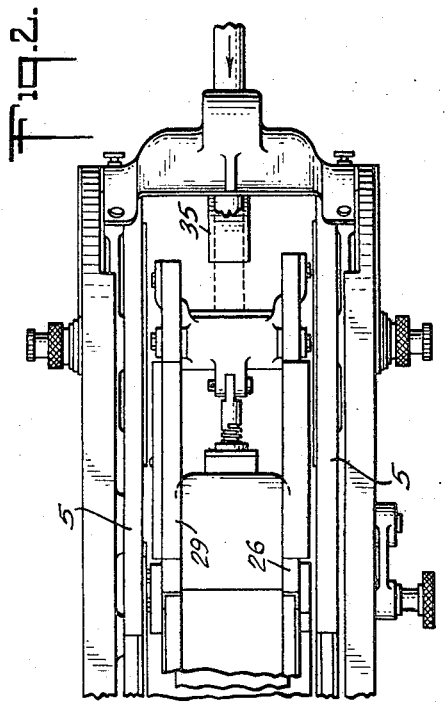
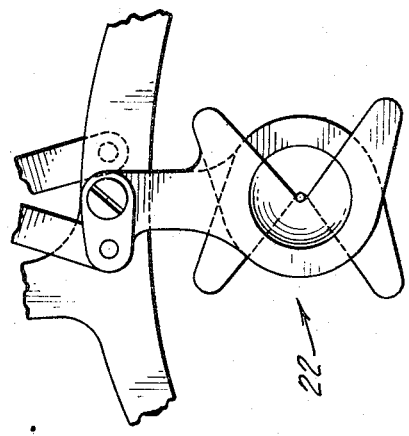
INVENTOR.
FRANCIS J. ZIOLKO
BY

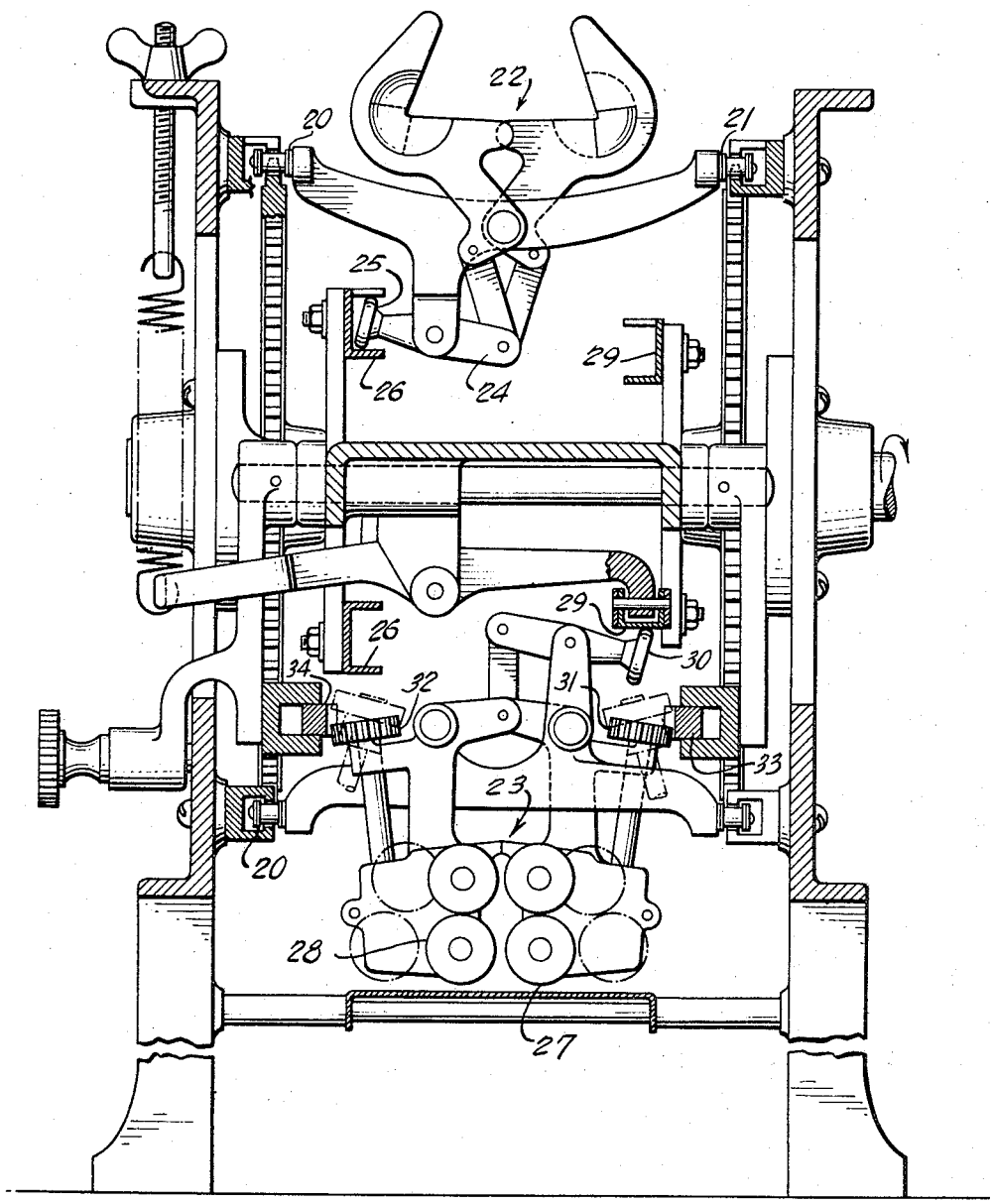

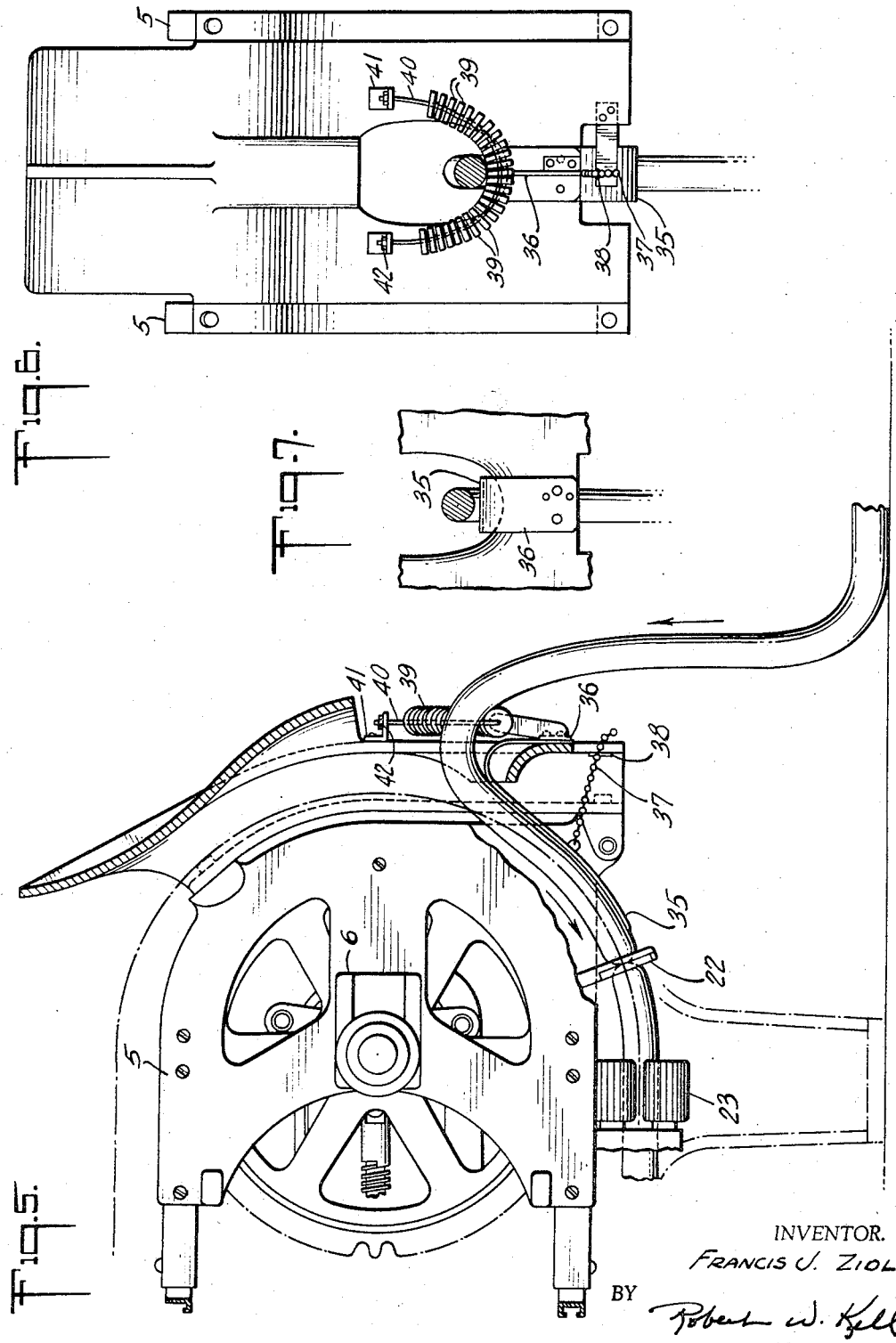

April 1, 1969      F. J. ZIOLKO      3,435,482

MACHINE AND PROCESS OF LINKING STUFFED CASINGS

Filed July 2, 1965

INVENTOR.
FRANCIS J. ZIOLKO
BY Robert W. Kell
ATTORNEY

United States Patent Office 3,435,482
Patented Apr. 1, 1969

3,435,482
MACHINE AND PROCESS OF LINKING
STUFFED CASINGS
Francis J. Ziolko, Somerville, N.J., assignor to Johnson
& Johnson, a corporation of New Jersey
Filed July 2, 1965, Ser. No. 469,243
Int. Cl. A22c 11/00, 11/02
U.S. Cl. 17—45                             4 Claims

ABSTRACT OF THE DISCLOSURE

Apparatus is provided for linking a relatively long length of stuffed casing to form individual sausages of uniform length. The filled casing is advanced along a predetermined path by a conveyor. A constant tension device that precedes the conveyor resiliently supports the casing. A plurality of sausage pinching and sausage twisting sets mounted alternately and equidistantly on the conveyor constrict the casing at intervals without interrupting its movement, thereby dividing the stuffed casing into individual links of uniform predetermined length. Each individual link is rotated axially as it advances thereby forming a twist in the casing section between it and the next succeeding link.

---

This invention relates to a method of linking a stuffed sausage casing and more specifically to an improvement in sausage linking machines of the type described in the Allen et al. Patent No. 1,866,497.

A machine for automatically pinching a filled sausage casing thereby dividing it into sausages of a specified length and forming said individual sausages by means of a twisting process (commonly referred to as a Famco linker) has been manufactured for some years by the Allen Gauge & Tool Company of Pittsburgh, Pa. This automatic sausage linker, the operation of which is described in the patent referred to above, has found wide use on most types of smaller sausages such as the so-called wieners, frankfurters, pork sausages, etc. Such a linker is particularly well adapted to link pork sausages that have been stuffed into extruded collagen casings of the type described in U.S. Patents Nos. 3,123,480; 3,123,481; 3,123,-482; 3,123,483; 3,123,653; and 3,151,990.

One disadvantage of this type of linker, however, is the formation of long links at the trailing end of the stuffed sausage casing.

The uniformity in diameter of extruded collagen casings is an important advantage in packaging, but this advantage is lost if the trailing end of the stuffed casing is formed into extraordinarily long links that are not accommodated by the package. It has now been discovered that the sausage linking machine described in U.S. Patent No. 1,866,497 may be modified by resiliently supporting the stuffed sausage casing at the point that the pinchers grasp the casing. The resilient support frictionally engages the stuffed casing as it enters the linking machine, thereby resulting in a constant tension that produces uniform links throughout the length of the casing.

Additional features and advantages of this invention as well as the construction of the resilient support and the manner in which it cooperates with other elements of the machine will appear from the following detailed description considered in connection with the accompanying drawings forming a part of this application, and in which:

FIGURE 1 shows a side elevation of a sausage linking machine, the center portion being broken out.

FIG. 2 is a plan view of the right hand portion of FIG. 1, parts being omitted for clarity.

FIG. 3 is a fragmental detail on an enlarged scale of the long squeezing fingers taken approximately on the line 3—3 of FIG. 1.

FIG. 4 shows an enlarged view in vertical cross-section as indicated by the line 4—4 of FIG. 1.

FIG. 5 is an enlarged detail view of the right end of FIG. 1, part in elevation and part in section.

FIG. 6 is an end view of FIG. 5, parts being omitted.

FIG. 7 shows a fragmental view of the link aperture and guide.

Figure 8:
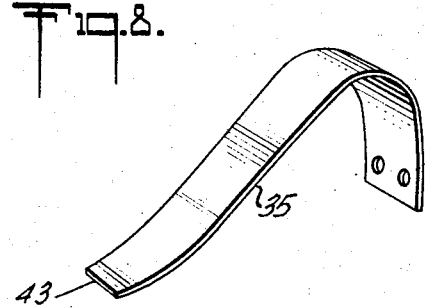
FIG. 8 is a perspective of a guide as shown in FIG. 1.

As indicated above, the present invention relates to a modification of a machine that automatically divides a filled sausage casing into individual sausages of a specified length and forms the individual sausages by twisting the casing by the links. Reference is made to U.S. Patent No. 1,866,497 for a detailed description of the sausage linking machine shown in FIG. 1.

The general operation of the machine will be apparent from FIG. 4 which shows the endless conveyor chains 20 and 21 that carry moveable sets of pinchers 22; and sausage twisting sets 23 that alternate with the sausage pinchers. The sausage pinchers have an extending rocker arm 24 that terminates in a contact roller 25 which is operated by a stationary cam rail 26 to rockably operate the pinching elements. Each sausage twisting set includes a pair of rolls 27 and 28 which are gear-driven and rockably mounted to rock inwardly by means of a cam 29 which acts on a contact roller 30 and rocker arm to close the rolls on the periphery of the sausage casing. The gear drive for each pair of rollers terminates in a pinion 31, 32 which cooperate with a rack 33, 34 as the pinching set is moved by the conveyor chains.

The guide 35 of the present invention is illustrated in FIG. 8 and its position when mounted on the linking machine is shown in FIGS. 1 and 2. The operation of the guide 35 will now be described by following the performance of a group of pinching and twisting elements, reference being made in particular to FIGS. 1, 2 and 3, it being assumed that the motor is operating the conveyor in the direction indicated by the arrows. The operator lays a previously stuffed casing on the guide 35 and pushes the casing into the machine in position to be engaged by the first downwardly moving pinching set. While travelling along the upper section of the cam rail 26, this pinching set is held open, i.e., in a position to straddle the sausage casing. However, as the contact roller 25 of the pinching set enters the front end portion of the cam, the pinching fingers begin to close gradually on the casing and reach the closed position illustrated in FIG. 3 rather rapidly. The pincher elements are completely closed at the time they reach the position indicated by the line 3—3 in FIG. 1.

The first pinching set is of course followed by a twisting set, the rollers of which will remain in open position while the contact roller 30 travels along the upper section of the cam rail 29. This roller engages the underside of the cam rail 29 and causes the rollers to close on the sausage casing, shortly after the latter has been pinched.

Further movement of the conveyor brings the rack gear 31, 32 of the twisting set into mesh with the rack 33, 34.

It will be noted that the downwardly moving pincher sets describe an arc before engaging the casing and that the point at which each succeeding set of pinchers engages the casing determines the length of casing between the pinchers and the length of the sausage link formed. In the absence of the guide 35 the filled casing will sag to a degree dependent upon the weight of the trailing end of the stuffed casing. Such sagging will result in a variation in the length of casing that is grasped between the two sets of pinchers.

The sausage linking machine is modified in accordance with the present invention by a guide 35 which is fastened to the feeding end of the machine by screws 36. This guide may be constructed of spring metal or a resilient nontoxic plastic material.

The guide 35 operates to support the moving length of stuffed casing in the position illustrated in FIG. 1, while maintaining a constant sliding tension on the casing as it is drawn into the linking machine, until such time as the pincher elements close on the casing. The tension applied to the casing during the linking operation may be controlled by a chain 37 retained in a V-shaped slot 38.

To facilitate the entry of the stuffed casing into the linking machine in such a manner that contact is maintained between the guide and the casing, a positioning device of the type illustrated in FIG. 6 may be employed. The positioning device may comprise plurality nylon disks 39 mounted on a curved axle 40 in a manner that permits the rotation on this axle of each disk. The axle 40 is threaded at each end and is mounted in front of the guide 35 by means of projecting flanges 41 and nuts 42.

Figure 10:
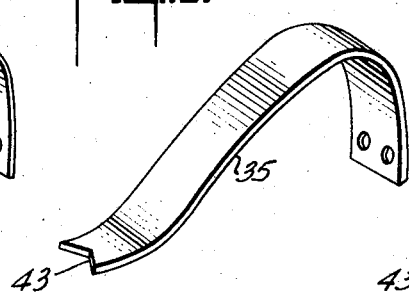
FIG. 10 is a view in perspective of a modified form of guide.
Figure 11:
FIG. 11 is a detail perspective view of a still further modification of FIG. 10.
Figure 9:
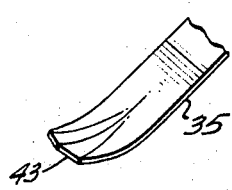
FIG. 9 is a detail view in perspective of the lower or flexible end of the guide shown in FIG. 8 and modified as shown.

The end 43 of the guide may be modified as indicated in FIGS. 9, 10, or 11 to maintain alignment of the moving casing with the guide and the pinchers.

Figure 12:
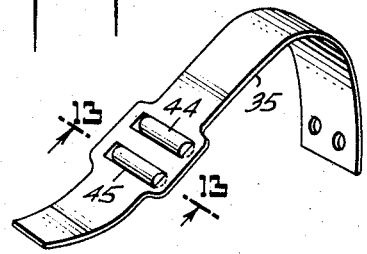
FIG. 12 is a perspective view of a guide employing rollers.
Figure 13:
FIG. 13 shows an enlarged cross section taken on the lines 13—13 of FIG. 12.

A further modification of the guide 35 is illustrated in FIGS. 12 and 13. In this modification cylindrical rollers 44 and 45 are rotatably mounted on the axles 46 retained in bosses 47.

Figure 14:
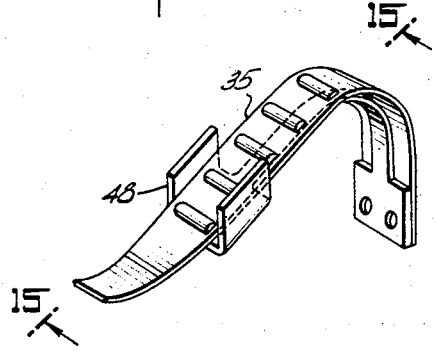
FIG. 14 is a still further modified form of a guide.
Figure 15:
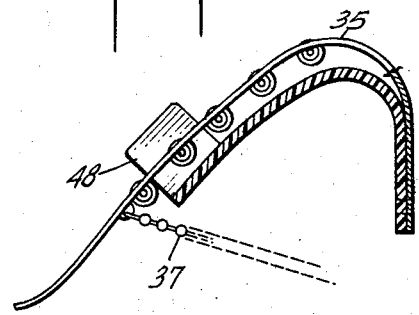
FIG. 15 is a vertical cross section therethrough and taken on lines 15—15 of FIG. 14.

FIGS. 14 and 15 illustrate a guide which is fitted with cylindrical rollers to reduce the sliding friction and a U-shaped bracket 48 which functions to maintain alignment between the moving stuffed casing, the guide, and the pinchers of the linking machine.

While the invention as described in detail according to the preferred apparatus for carrying out the process, it will be obvious to those skilled in the art, after understanding the invention that changes and modifications may be made therein without departing from the spirit or scope of the invention and it is intended in the appended claims to cover all such alterations and modifications.

What is claimed is:

1. A method of forming a relatively long length of filled casing into a series of individual links of uniform length which are separated from each other by twisted sections of the casing, which method comprises:
   advancing the filled casing under constant tension along a predetermined path;
   resiliently supporting the advancing casing; while constricting the casing at intervals without interrupting its movement to divide the same into individual links of uniform predetermined length; and
   axially rotating each individual link as it advances to form a twist in the casing section between it and the next succeeding link.

2. In a method of linking filled sausage casings, characterized by pinching said filled casing to form individual sausages of predetermined uniform lengths and twisting the casing between the links, the improvement which comprises resiliently supporting the filled casing as it is pinched, whereby sagging of the casing and the formation of long lengths is prevented.

3. Mechanism for linking a relatively long length of stuffed sausage casing to form individual sausages of uniform length including in combination:
   an endless conveyor that is operative to move said casing forwardly;
   a plurality of sausage pinching and sausage twisting sets mounted alternately and equidistantly on said conveyor;
   individual cam-rail systems effective on said pinching and twisting sets to bring the same into engagement with the stuffed sausage casing to be linked;
   a resilient support so positioned with respect to said sausage pinching means as to apply a constant frictional tension to the stuffed sausage casing;
   power means to operate said conveyor; and
   a supporting frame structure for said conveyor.

4. Mechanism for linking a relatively long length of stuffed sausage casing to form individual sausages of uniform length including in combination:
   an endless conveyor that is operative to move said casing forwardly;
   a plurality of sausage pinching and sausage twisting sets mounted alternately and equidistantly on said conveyor;
   individual cam-rail systems effective on said pinching and twisting sets to bring the same into engagement with the stuffed sausage casing to be linked;
   a resilient support positioned immediately adjacent to said sausage pinching set thereby supporting the stuffed sausage casing as said pinching set engages the stuffed sausage casing;
   power means to operate said conveyor; and
   a supporting frame structure for said conveyor.

References Cited

UNITED STATES PATENTS

| 1,366,183 | 1/1921 | Hottmann | 17—33 |
| 1,866,497 | 7/1932 | Allen et al. | 17—34 |

FOREIGN PATENTS 20,096     1912     Great Britain.

LUCIE H. LANDENSLAGER, *Primary Examiner.*

U.S. Cl X.R.

17—34; 99—109

UNITED STATES PATENT OFFICE
CERTIFICATE OF CORRECTION

Patent No. 3,435,482                                April 1, 1969

Francis J. Ziolko

It is certified that error appears in the above identified patent and that said Letters Patent are hereby corrected as shown below:

Column 3, line 11, cancel "the", second occurrence. Column 4, line 14, beginning with "3. Mechanism for" cancel all to and including "said conveyor." in line 29; line 30, "4." should read -- 3. --; after line 45, insert the following claim:

4. In a sausage linking machine having means for pinching and twisting a stuffed sausage casing:
      a frame structure upon which is mounted an endless conveyor that is operative to move said casing forwardly;
      a plurality of sausage pinching and sausage twisting sets mounted alternately and equidistantly on said conveyor;
      individual cam-rail systems effective on said pinching and twisting sets to bring the same into engagement with the stuffed sausage casing to be linked;
      a flexible contoured metal finger removably connected at one end thereof to said frame structure, the other end of said finger being so positioned with respect to said pinching means as to frictionally engage the stuffed casing and provide support therefor as the pinching means closes on the casing.

Signed and sealed this 21st day of April 1970.

(SEAL)
Attest:

EDWARD M. FLETCHER, JR.                    WILLIAM E. SCHUYLER, JR.
Attesting Officer                               Commissioner of Patents